US012689935B2

(12) United States Patent
Hu et al.

(10) Patent No.: US 12,689,935 B2
(45) Date of Patent: Jul. 21, 2026

(54) METHOD FOR AUTOMATICALLY ENABLING ACCESS POINT FUNCTION AND RELAY FUNCTION, AND ELECTRONIC DEVICE

(71) Applicant: HUAWEI TECHNOLOGIES CO., LTD., Shenzhen (CN)

(72) Inventors: Yufeng Hu, Xi'an (CN); Qihang Chen, Xi'an (CN); Yu Hu, Xi'an (CN); Gaopeng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 691 days.

(21) Appl. No.: 18/001,113

(22) PCT Filed: Mar. 29, 2021

(86) PCT No.: PCT/CN2021/083607
§ 371 (c)(1),
(2) Date: Dec. 8, 2022

(87) PCT Pub. No.: WO2021/248983
PCT Pub. Date: Dec. 16, 2021

(65) Prior Publication Data
US 2023/0217294 A1 Jul. 6, 2023

(30) Foreign Application Priority Data

Jun. 12, 2020 (CN) .......................... 202010537476.4

(51) Int. Cl.
*H04W 24/10* (2009.01)
*H04B 17/318* (2015.01)
(Continued)

(52) U.S. Cl.
CPC ....... *H04W 28/0231* (2013.01); *H04W 48/06* (2013.01); *H04W 48/16* (2013.01)

(58) Field of Classification Search
CPC ............................ H04W 24/10; H04B 17/318
See application file for complete search history.

(56) References Cited

U.S. PATENT DOCUMENTS

| | | | | | |
|---|---|---|---|---|---|
| 5,461,627 | A | * | 10/1995 | Rypinski | H04W 74/06 370/349 |
| 6,584,080 | B1 | * | 6/2003 | Ganz | H04L 1/1825 370/316 |

(Continued)

FOREIGN PATENT DOCUMENTS

| | | | | | | |
|---|---|---|---|---|---|---|
| BR | 112013001687 | B1 | * | 2/2022 | ........... | H04B 7/0452 |
| CN | 102833605 | A | * | 12/2012 | | |

(Continued)

OTHER PUBLICATIONS

"Cisco 802.11 Wireless Networking: Installing andConfiguring Access Points", Cisco Press (Year: 2005).*

(Continued)

*Primary Examiner* — Jayanti K Patel
(74) *Attorney, Agent, or Firm* — WOMBLE BOND DICKINSON (US) LLP

(57) ABSTRACT

Embodiments of this application relate to the field of terminal technologies and disclose a method for automatically enabling an access point function and a relay function, and an electronic device. After an electronic device is powered on, if the electronic device is connected to a wired network and does not use the network within preset duration, an AP mode is enabled; or if the electronic device is connected to a wireless network and does not use the network within preset duration, a repeater mode is enabled. The AP function and the relay function can be automatically enabled on the electronic device such as a personal computer or a smart screen, and an existing device of a consumer can be set as an AP or a repeater. The consumer does not need to buy a (Continued)

Electronic device 400 dedicated AP or repeater. This improves Wi-Fi use experience of the consumer.

18 Claims, 9 Drawing Sheets

(51) Int. Cl.
    *H04W 28/02*         (2009.01)
    *H04W 48/06*         (2009.01)
    *H04W 48/16*         (2009.01)

(56)           References Cited

U.S. PATENT DOCUMENTS

| | | | | |
|---|---|---|---|---|
| 7,180,875 B1 * | 2/2007 | Neumiller | ............... | H04L 45/16 |
| | | | | 370/449 |
| 8,018,888 B1 * | 9/2011 | Fuller | ..................... | H04W 4/40 |
| | | | | 370/352 |
| 2002/0048369 A1 * | 4/2002 | Ginter | ................... | H04L 9/3263 |
| | | | | 380/246 |
| 2003/0142652 A1 * | 7/2003 | Ting | ..................... | H04M 3/567 |
| | | | | 348/E7.079 |
| 2004/0001429 A1 * | 1/2004 | Ma | ....................... | H04L 5/0046 |
| | | | | 370/210 |
| 2005/0111397 A1 * | 5/2005 | Attar | ................... | H04W 74/002 |
| | | | | 370/319 |

| | | | | |
|---|---|---|---|---|
| 2008/0075034 A1 * | 3/2008 | Hsieh | ..................... | H04W 48/16 |
| | | | | 370/328 |
| 2008/0101330 A1 * | 5/2008 | Cheng | ................... | H04W 24/02 |
| | | | | 370/350 |
| 2010/0111055 A1 * | 5/2010 | Chiu | ..................... | H04W 24/02 |
| | | | | 370/338 |
| 2011/0205956 A1 * | 8/2011 | Inada | ..................... | H04W 84/12 |
| | | | | 370/315 |
| 2012/0032876 A1 * | 2/2012 | Tabe | ..................... | H01Q 1/245 |
| | | | | 455/571 |
| 2017/0332155 A1 * | 11/2017 | Branch | ................... | H04Q 9/00 |
| 2019/0159254 A1 * | 5/2019 | Garde | ................... | H04W 24/02 |
| 2023/0123352 A1 * | 4/2023 | Hong | ................. | H04B 17/318 |
| | | | | 370/329 |
| 2023/0180029 A1 * | 6/2023 | Peng | ..................... | H04W 24/02 |
| | | | | 370/252 |

FOREIGN PATENT DOCUMENTS

| | | | | |
|---|---|---|---|---|
| CN | 110636381 A | 12/2019 | | |
| CN | 111836339 A | * 10/2020 | ........... | H04W 48/08 |
| KR | 20080095264 A | * 10/2008 | ............ | H04B 7/155 |

OTHER PUBLICATIONS

CN-102833605-A Translation.*
CN-111836339-A Translation.*
KR-20080095264-A Translation.*

* cited by examiner

Wired network
interface

100

200

200

200

Wired network
interface

100

Wired network
interface

100

200

200

200

| S401: Obtain Wi-Fi configuration information |
| :---: |

| S402: Periodically detect a status of an electronic device |
| :---: |

| S403: Determine that a specified condition is met, and enable a Wi-Fi function based on a network access mode of the electronic device |
| :---: |

METHOD FOR AUTOMATICALLY ENABLING ACCESS POINT FUNCTION AND RELAY FUNCTION, AND ELECTRONIC DEVICE

CROSS-REFERENCE TO RELATED APPLICATIONS

This application is a national stage of International Application No. PCT/CN2021/083607, filed on Mar. 29, 2021, which claims priority to Chinese Patent Application No. 202010537476.4, filed on Jun. 12, 2020. Both of the aforementioned applications are hereby incorporated by reference in their entireties.

TECHNICAL FIELD

This application relates to the field of terminal technologies, and in particular, to a method for automatically enabling an access point function and a relay function, and an electronic device.

BACKGROUND

Wireless fidelity (Wi-Fi) is a technology through which terminal devices can connect to each other in a wireless manner, and is used to improve interoperability between wireless network products supporting the IEEE802.11 standard.

A frame used in an 802.11 network needs to be converted before being transmitted to a wired network. A device having a wireless-to-wired bridging function is referred to as an access point (AP). For example, as shown in FIG. 1A, an AP 100 is inserted into a wired network interface, and has a wireless-to-wired bridging function; and terminal devices 200 (for example, a mobile phone, a tablet, and a personal computer) may access a wired network by accessing a Wi-Fi network provided by the AP 100, to communicate with another network device.

The coverage of a single AP is limited, and obstacles such as a wall weaken strength of a wireless signal. To ensure quality of a Wi-Fi signal, generally, several APs are networked or a repeater is used, to enhance the strength of the wireless signal and expand the coverage of the wireless signal. A wireless-to-wired bridging function is referred to as an AP function. A function of enhancing strength of a Wi-Fi signal is referred to a relay function.

For example, as shown in FIG. 1B, two APs 100 having a same service set identifier (SSID) are networked, and terminal devices 200 may roam in an environment in which the two APs 100 are networked. Compared with a local area network shown in FIG. 1A, a local area network including the two APs 100 has larger coverage. As shown in FIG. 1C, a repeater 300 and an AP 100 that have a same SSID are networked; the repeater 300 receives a wireless signal from the AP 100, and enhances strength of the wireless signal; terminal devices 200 outside coverage of the wireless signal from the AP 100 may receive data from the AP 100 by using the repeater 300; data in the terminal devices 200 may arrive at the AP 100 through forwarding of the repeater 300; and the repeater 300 expands coverage of the AP 100.

Currently, products with the AP function and the relay function include dedicated devices such as a wireless router and a wireless repeater, and need to be purchased separately. This increases the burden of a consumer.

SUMMARY

Embodiments of this application provide a method for automatically enabling an access point function and a relay function, and an electronic device, to automatically enable the AP function and the relay function on an electronic device such as a personal computer or a smart screen. This improves Wi-Fi use experience of a consumer by using the AP function and the relay function on an existing device of the consumer.

To achieve the foregoing objectives, the following technical solutions are used in this application.

According to a first aspect, this application provides a method for automatically enabling an access point function and a relay function. The method may include: powering on an electronic device; and if the electronic device does not use a network within preset duration, setting the electronic device as an AP or a repeater based on a network access mode.

In the method, that the electronic device is automatically enabled to be the AP or the repeater is not used temporarily, and an idle electronic device may be used to expand a home network, to improve Wi-Fi use experience.

With reference to the first aspect, in an embodiment, if the electronic device is connected to a wired network, the electronic device is set as the AP. In an embodiment, if the electronic device is connected to a wireless network, the electronic device is set as the repeater.

With reference to the first aspect, in an embodiment, the method further includes: obtaining AP configuration information of the electronic device; and setting the electronic device to an AP mode based on the AP configuration information.

With reference to the first aspect, in an embodiment, the electronic device obtains AP configuration information of a Wi-Fi network to which the electronic device has connected. In an embodiment, the electronic device receives AP configuration information input by a user. For example, the electronic device may automatically synchronize the AP configuration information of the Wi-Fi network to which the electronic device has connected, and use the AP configuration information as AP configuration information for enabling the AP mode by the electronic device. Alternatively, the user may manually configure AP configuration information for enabling the AP mode by the electronic device.

With reference to the first aspect, in an embodiment, when access to the wired network is detected, the electronic device obtains the AP configuration information. Under this condition, the electronic device automatically obtains the AP configuration information. In an embodiment, if the user manually configures the electronic device to support automatic enabling of the AP function, the electronic device obtains the AP configuration information.

With reference to the first aspect, in an embodiment, the method further includes: obtaining AP configuration information of a Wi-Fi network accessed by the electronic device; and setting the electronic device to a repeater mode based on the AP configuration information of the Wi-Fi network.

With reference to the first aspect, in an embodiment, the AP configuration information includes at least one of the following: an SSID, an access password, and an encryption type.

With reference to the first aspect, in an embodiment, that the electronic device does not use a network within preset duration includes at least one of the following: The electronic device is screen-off, the electronic device is in a standby mode, and the electronic device does not upload or download data within the preset duration.

According to a second aspect, this application provides an electronic device. The electronic device includes a processor and a communication unit. The processor is configured to control the electronic device to be powered on. The communication unit is configured to connect to a network. The processor is further configured to: if the processor does not communicate with the network within preset duration by using the communication unit, set the electronic device as an AP or a repeater based on a network access mode.

With reference to the second aspect, in an embodiment, if the communication unit is connected to a wired network, the processor sets the electronic device as the AP. In an embodiment, if the communication unit is connected to a wireless network, the processor sets the electronic device as the repeater.

With reference to the second aspect, in an embodiment, the processor is further configured to obtain AP configuration information of the electronic device. The processor is further configured to set the communication unit to an AP mode based on the AP configuration information.

With reference to the second aspect, in an embodiment, the processor obtains AP configuration information of a Wi-Fi network to which the electronic device has connected. In an embodiment, the processor receives AP configuration information input by a user.

With reference to the second aspect, in an embodiment, the communication unit is further configured to detect whether the electronic device accesses the wired network. The processor is configured to obtain the AP configuration information if the communication unit detects that the electronic device accesses the wired network.

With reference to the second aspect, in an embodiment, the processor is further configured to obtain AP configuration information of a Wi-Fi network accessed by the electronic device. The processor is further configured to set the communication unit to a repeater mode based on the AP configuration information of the Wi-Fi network accessed by the electronic device.

With reference to the second aspect, in an embodiment, the AP configuration information includes at least one of the following: an SSID, an access password, and an encryption type.

With reference to the second aspect, in an embodiment, that the processor does not use a network within preset duration includes at least one of the following: The electronic device is screen-off, the electronic device is in a standby mode, and the communication unit does not upload or download data within the preset duration.

According to a third aspect, this application provides an electronic device. The electronic device may implement the method for automatically enabling an access point function and a relay function according to the first aspect. The electronic device may implement the foregoing method by using software or hardware, or by executing corresponding software by hardware. In an embodiment, the electronic device may include a processor and a memory. The processor is configured to support the electronic device in performing corresponding functions in the foregoing first aspect. The memory is configured to be coupled to the processor, and stores a program instruction and data that are necessary for the electronic device.

According to a fourth aspect, an embodiment of this application provides a computer-readable storage medium. The computer-readable storage medium includes computer instructions. When the computer instructions are run on an electronic device, the electronic device is enabled to perform the method for automatically enabling an access point function and a relay function according to the foregoing first aspect.

According to a fifth aspect, an embodiment of this application provides a computer program product. When the computer program product runs on a computer, the computer is enabled to perform the method for automatically enabling an access point function and a relay function according to the foregoing first aspect.

For technical effects brought by the electronic device according to the second aspect, the electronic device according to the third aspect, the computer-readable storage medium according to the fourth aspect, and the computer program product according to the fifth aspect, refer to the technical effects brought by the foregoing corresponding methods. Details are not described herein again.

DESCRIPTION OF EMBODIMENTS

Embodiments of this application provide a method for automatically enabling an access point function and a relay function. The method may be applied to an electronic device 400 shown in FIG. 2A.

The electronic device 400 may be any electronic device that supports a Wi-Fi function, for example, a smart screen, a smart television, a personal computer (PC), a notebook computer, or a smart household device (for example, a smart speaker or a smart refrigerator). A form of the electronic device 400 is not specially limited in an embodiment of this application.

Figures 1A, 1B:
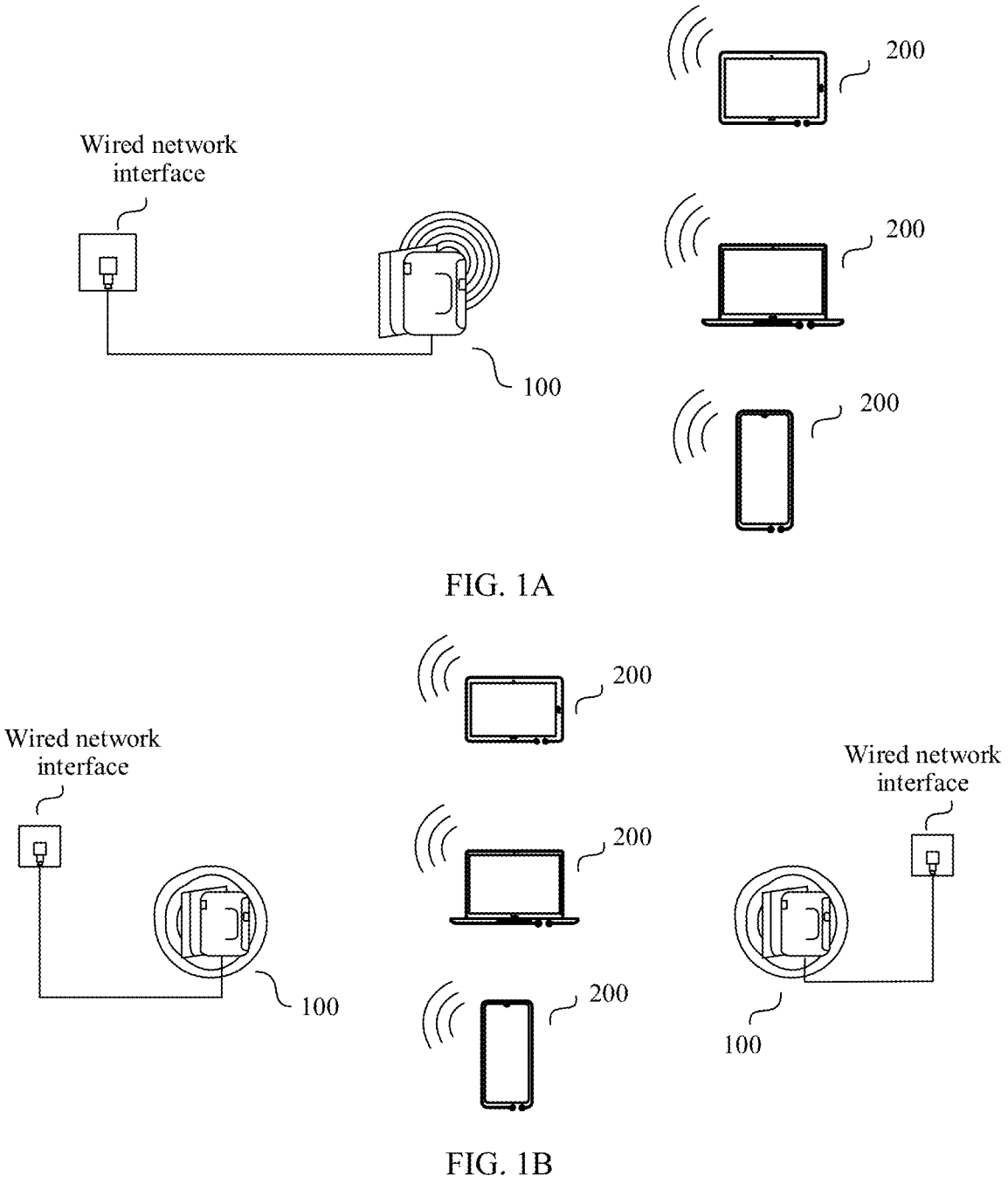
FIG. 1A is a schematic diagram 1 of an architecture of a Wi-Fi network in the conventional technology.
FIG. 1B is a schematic diagram 2 of an architecture of a Wi-Fi network in the conventional technology.
Figure 1C:
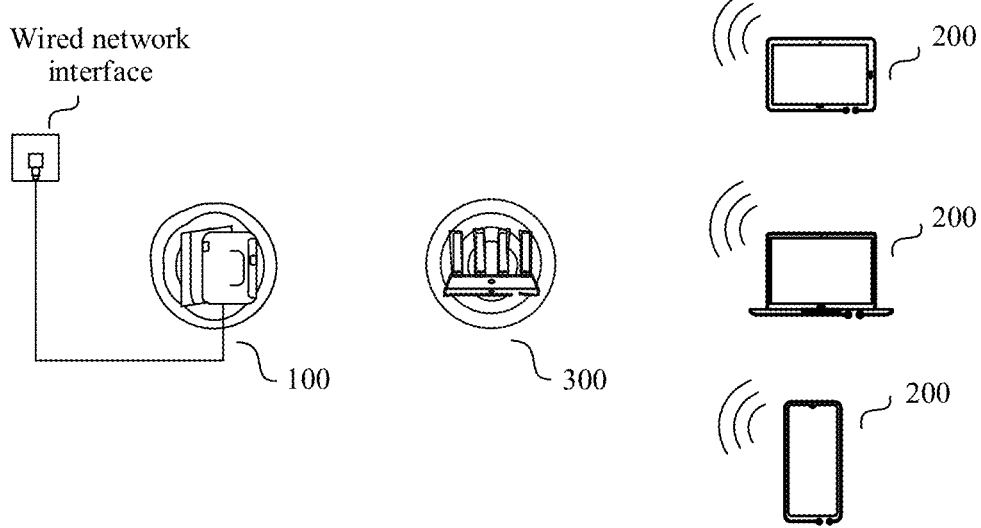
FIG. 1C is a schematic diagram 3 of an architecture of a Wi-Fi network in the conventional technology.
Figure 2A:
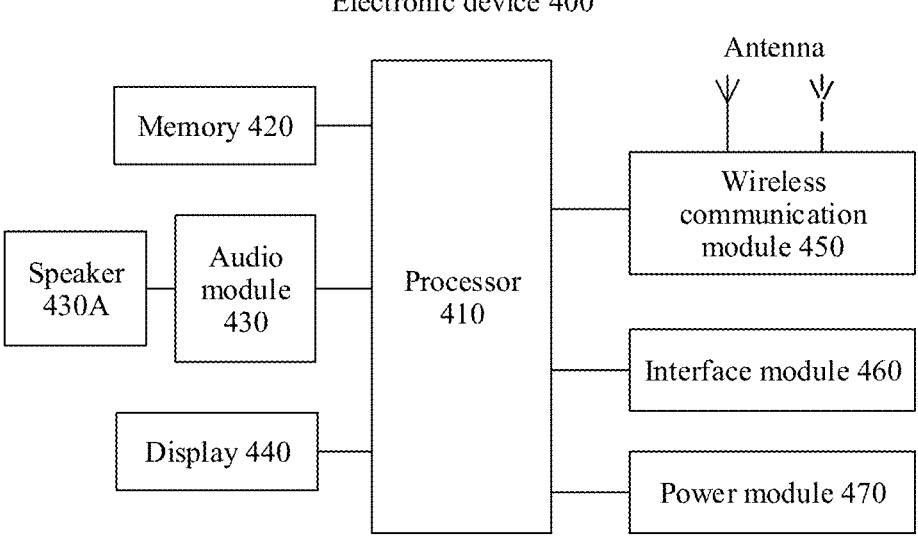
FIG. 2A is a schematic composition diagram 1 of a hardware structure of an electronic device according to an embodiment of this application.

FIG. 2A is a schematic diagram of a structure of the electronic device 400 according to an embodiment of the application. The electronic device 400 may include a processor 410, a memory 420, an audio module 430, a speaker 430A, a display 440, a wireless communication module 450, an interface module 460, a power module 470, and the like.

It may be understood that the structure shown in an embodiment of the present application does not constitute a limitation on the electronic device 400. In some other embodiments of this application, the electronic device 400 may include more or fewer components than those shown in the figure, some components may be combined, or some components may be split, or there may be a different component layout. The components shown in the figure may be implemented by hardware, software, or a combination of software and hardware.

The processor 410 may include one or more processors. For example, the processor 410 may include an application processor, a controller, a video codec, and/or a digital signal processor (DSP). Different processors may be independent components, or may be integrated into one or more processors.

The controller may be a nerve center and a command center of the electronic device 400. The controller may generate an operation control signal based on an instruction operation code and a time sequence signal, to complete control of instruction reading and instruction execution.

An operating system of the electronic device 400 may be installed on the application processor, and is configured to manage hardware and software resources of the electronic device 400, for example, manage and configure memory, determine a priority of system resource supply and demand, manage file systems, and manage drivers. The operating system may also be configured to provide an operating interface for a user to interact with the system. Various types of software, such as a driver and an application (App), may be installed in the operating system.

The digital signal processor is configured to process a digital signal, and may process another digital signal in addition to a digital image signal.

The video codec is configured to compress or decompress a digital video. The electronic device 400 may support one or more video codecs. In this way, the electronic device 400 may play videos in a plurality of encoding formats.

The memory 420 is configured to store an instruction and data. In some embodiments, the memory 420 is a cache. The memory may store an instruction or data that has been used or cyclically used by the processor 410. If the processor 410 needs to use the instruction or the data again, the processor 410 may directly invoke the instruction or the data from the memory 420. This avoids repeated access and reduces a waiting time of the processor 410, thereby improving system efficiency.

In some embodiments, the memory 420 may alternatively be disposed in the processor 410, that is, the processor 410 includes the memory 420. This is not limited in an embodiment of the application.

The audio module 430 is configured to convert digital audio information into an analog audio signal for output, and is also configured to convert an analog audio input into a digital audio signal. The audio module 430 may be further configured to encode and decode an audio signal. In some embodiments, the audio module 430 may be disposed in the processor 410, or some function modules of the audio module 430 are disposed in the processor 410.

The speaker 430A, also referred to as a "loudspeaker", is configured to convert an audio electrical signal into a sound signal.

The electronic device 400 may implement an audio function by using the audio module 430, the speaker 430A, the application processor, and the like, for example, sound playback.

The display 440 is configured to display an image, a video, or the like. The display 440 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In an embodiment of the application, the display 440 may be configured to display an application interface and the like.

The wireless communication module 450 may provide a solution that is applied to the electronic device 400 and that includes wireless communications such as a wireless local area network (WLAN) (for example, a wireless fidelity (Wi-Fi) network), Bluetooth (BT), frequency modulation (FM), and an infrared (IR) technology. The wireless communication module 450 may be one or more components integrating at least one communication processor module. The wireless communication module 450 receives an electromagnetic wave through an antenna, performs frequency modulation and filtering processing on an electromagnetic wave signal, and sends a processed signal to the processor 410. In an embodiment of the application, the wireless communication module 450 may include a Wi-Fi chip, configured to implement an AP function or a relay function of the electronic device 400 in an embodiment of the application.

The interface module 460 may include a network cable interface, a USB port, an audio output interface, a high definition multimedia interface (HDMI), a memory card interface, and the like. A network cable can be inserted into the network cable interface. One end of the network cable is inserted into the network cable interface of the electronic device 400, and another end is inserted into a wired network interface, that is, the electronic device 400 accesses the wired network. The USB port is an interface that conforms to a USB standard specification, and may be a mini USB port, a micro USB port, a USB type-C port, or the like. The USB port may be configured to transmit data between the electronic device 400 and a peripheral device. For example, the electronic device 400 may be connected to an external storage device, an external camera, a game console, and the like through the USB port. The audio output interface of the device is configured to connect to an external audio device, for example, to connect to a speaker. The HDMI is an all-digital video and sound sending interface, and may simultaneously send uncompressed audio and video signals. For example, the electronic device 400 may be connected to a device, for example, a wired set-top box, a network set-top box, or a speaker through the HDMI interface. The memory card interface is configured to connect to an external memory card, for example, a microSD card, to expand a storage capability of the electronic device 400.

The power module 470 may be configured to supply power to components included in the electronic device 400.

Figure 2B:
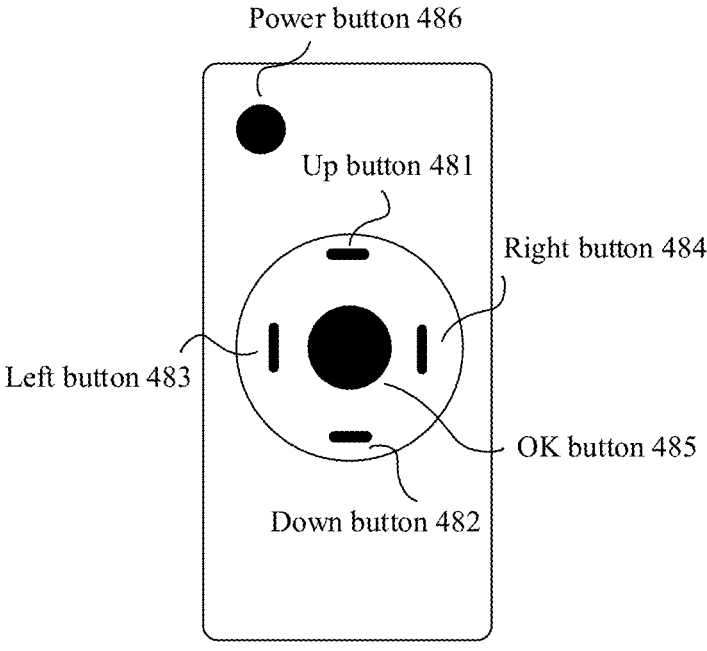
FIG. 2B is a schematic composition diagram 2 of a hardware structure of an electronic device according to an embodiment of this application.

Generally, the electronic device 400 is equipped with a remote control. The remote control is configured to control the electronic device 400. FIG. 2B is a schematic diagram of a structure of a remote control 480. The remote control 480 may include a plurality of buttons, for example, an up button 481, a down button 482, a left button 483, a right button 484, an OK button 485, and a power button 486. The button on the remote control 480 may be a mechanical button or a touch button. The remote control 480 may receive a button input, generate a button signal input related to user settings and function control of the electronic device 400, and send corresponding signals to the electronic device 400 to control the electronic device 400. For example, when a user presses the up button 481, the down button 482, the left button 483, the right button 484, the OK button 485, or the power button 486, the button may send a corresponding signal, and send a signal to the electronic device 400 in a manner such as Bluetooth or infrared. If the electronic device 400 receives, by using the wireless communication module 450 (for example, Bluetooth or IR), a signal corresponding to a button, the electronic device 400 may perform a corresponding operation based on the signal.

It may be understood that the remote control 480 may further include other buttons and components, such as a volume button, a Bluetooth interface, an infrared interface, and a battery accommodation cavity (used for installation of a battery, to supply power to the remote control). Details are not described in an embodiment of the application.

Embodiments of this application provide the method for automatically enabling the access point function and the relay function. The electronic device 400 (for example, the PC or the smart screen) supporting the Wi-Fi function may be used as an AP or a repeater, to provide a wireless signal for a terminal device. A consumer can expand a home wireless network without buying a dedicated router or repeater. This improves Wi-Fi use experience.

The following embodiments of this application are described by using an example in which the smart screen is used as the electronic device 400.

Figure 3A:
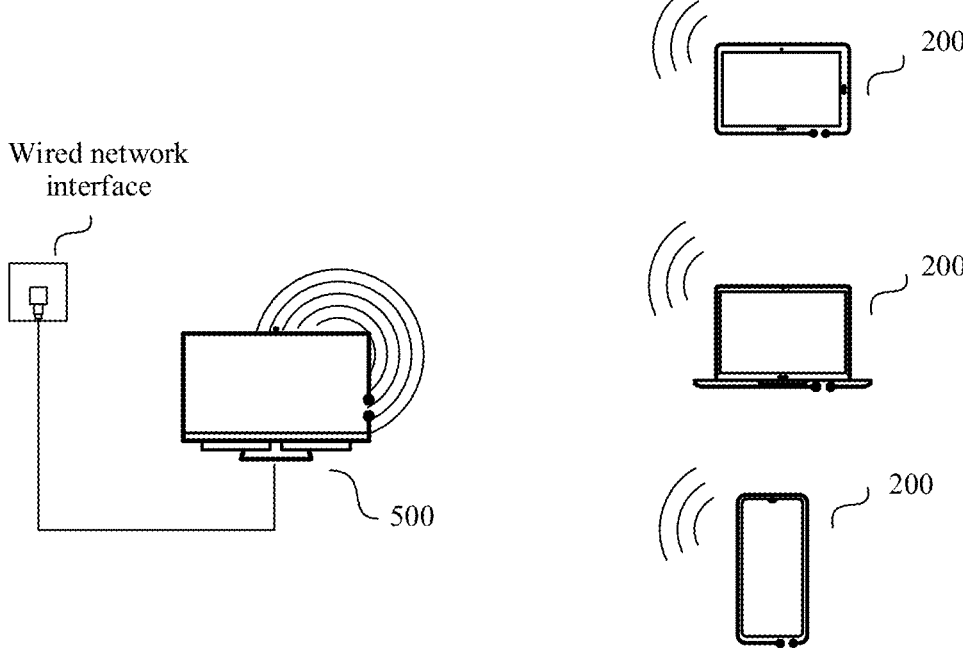
FIG. 3A is a schematic diagram 1 of an example of a scenario for a method for automatically enabling an access point function and a relay function according to an embodiment of this application.

For example, as shown in FIG. 3A, a smart screen 500 is connected to a wired network interface through a network cable, to enable an AP function. Terminal devices 200 may access a Wi-Fi network provided by the smart screen 500 as an AP.

Figures 3B, 4:
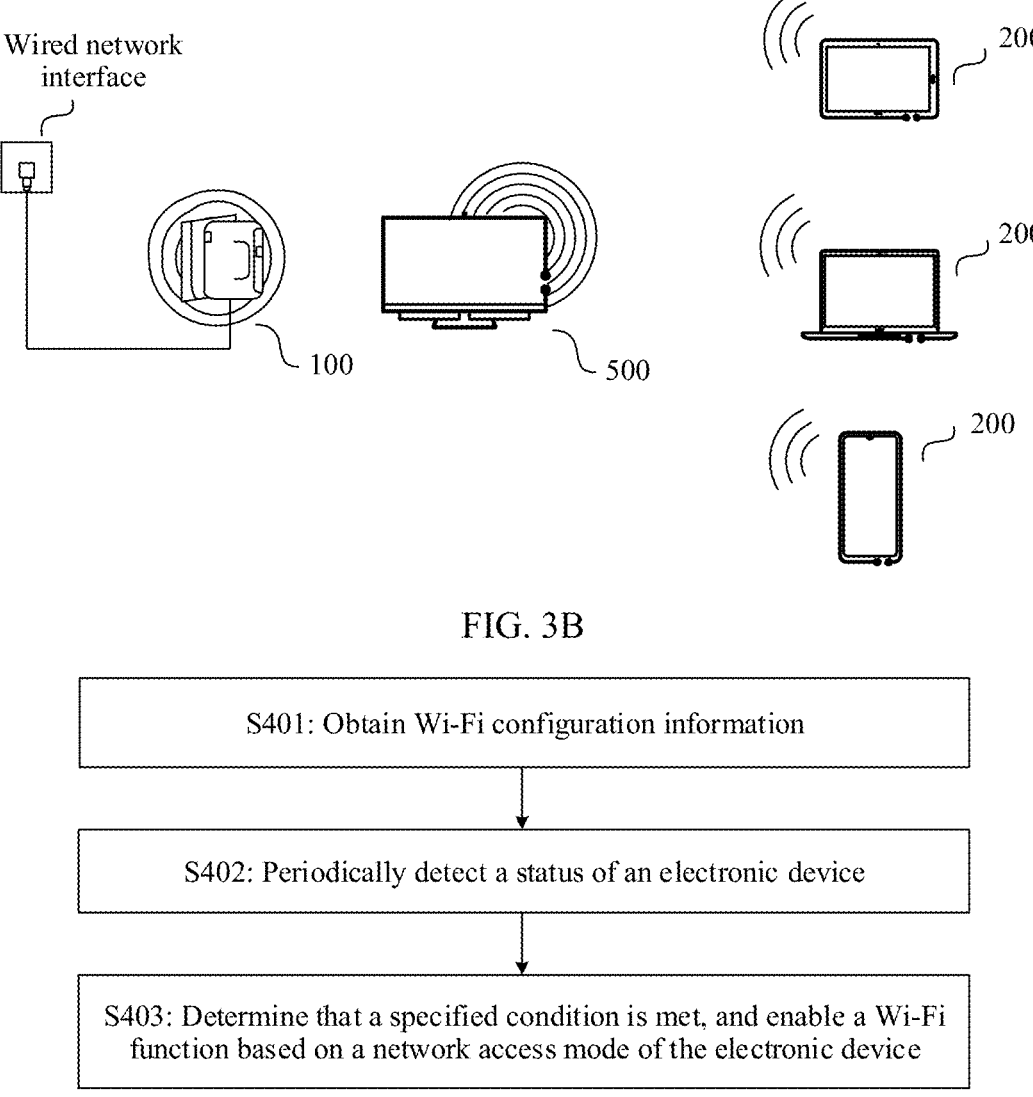
FIG. 3B is a schematic diagram 2 of an example of a scenario for a method for automatically enabling an access point function and a relay function according to an embodiment of this application.
FIG. 4 is a flowchart 1 of a method for automatically enabling an access point function and a relay function according to an embodiment of this application.

For example, as shown in FIG. 3B, a smart screen 500 accesses a Wi-Fi network provided by an AP 100, to enable a relay function, and enhances a received wireless signal from the AP 100. Terminal devices 200 are in coverage of a wireless signal from the smart screen 500, and access the Wi-Fi network provided by the AP 100.

An embodiment of this application provides a method for automatically enabling an access point function and a relay function. The method may be applied to the electronic device 400 in FIG. 2A. As shown in FIG. 4, the method may include the following operations.

S401: Obtain Wi-Fi configuration information.

Figure 5A:
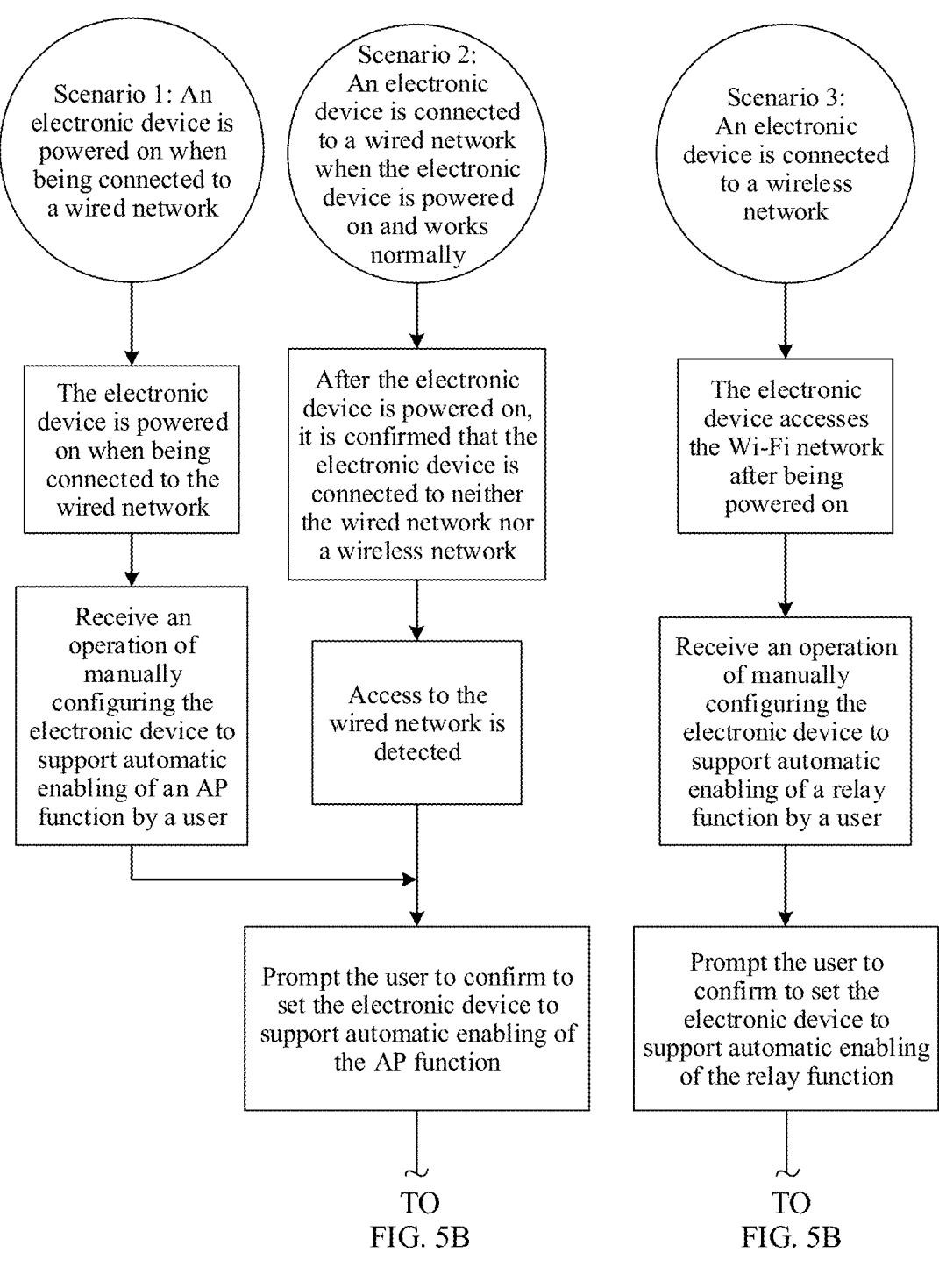
FIG. 5A and FIG. 5B are a flowchart 2 of a method for automatically enabling an access point function and a relay function according to an embodiment of this application.
Figure 5B:
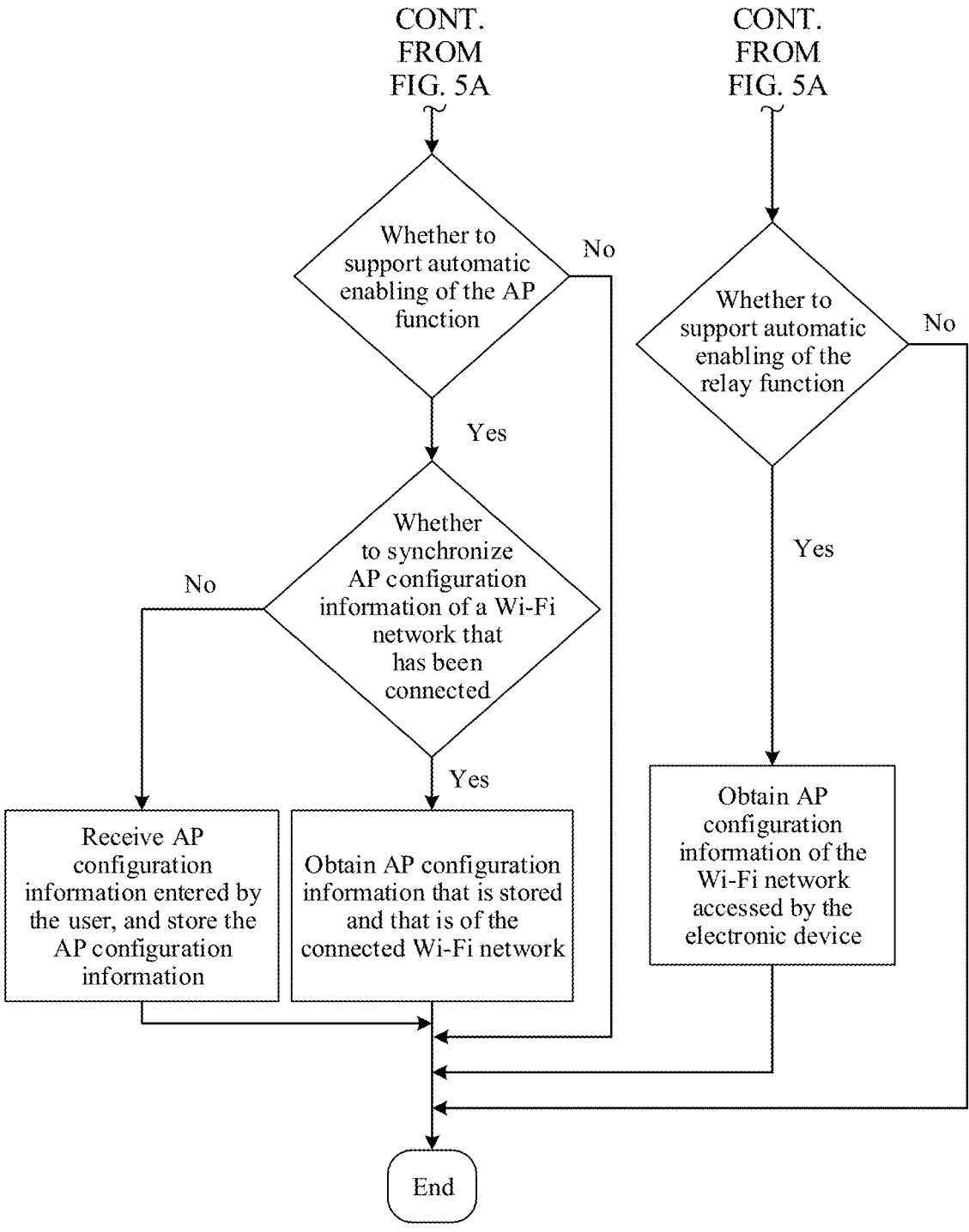

FIG. 5A and FIG. 5B show a procedure in which an electronic device obtains the Wi-Fi configuration information in some scenarios. The electronic device may be configured to automatically enable the AP function or the relay function. If the AP function is enabled, the electronic device obtains the Wi-Fi configuration information, that is, obtains AP configuration information of the electronic device; or if the relay function is enabled, the electronic device obtains the Wi-Fi configuration information, that is, obtains AP configuration information of a Wi-Fi network accessed by the electronic device.

In some embodiments, after the electronic device is powered on, it is confirmed that the electronic device is connected to a wired network. For example, before being powered on, the electronic device is connected to a wired network interface through a network cable. Scenario 1 in FIG. 5A and FIG. 5B: The electronic device is powered on when being connected to a wired network.

In an embodiment, after the electronic device is powered on when being connected to the wired network, a user manually configures the electronic device to support automatic enabling of the AP function. For example, the user may open a setting application on a display interface of a smart screen, and set the smart screen to support automatic enabling of the AP function. The electronic device receives an operation of manually configuring the electronic device to support automatic enabling of the AP function by the user. In response to the operation of manually configuring the electronic device to support automatic enabling of the AP function by the user, the electronic device obtains the AP configuration information. In an embodiment, before obtaining the AP configuration information, the electronic device may display first prompt information. The first prompt information is used to prompt the user to confirm to set the electronic device to support automatic enabling of the AP function. Further, the electronic device determines, based on a selection of the user, whether to support automatic enabling of the AP function. If the electronic device determines, based on the selection of the user, to support automatic enabling of the AP function, the electronic device obtains the AP configuration information. If the electronic device determines, based on the selection of the user, not to support automatic enabling of the AP function, the electronic device exits, and does not obtain the AP configuration information.

A manner of obtaining the AP configuration information may include: synchronizing AP configuration information of a Wi-Fi network to which the electronic device has connected, or obtaining AP configuration information based on an input of the user. In an embodiment, the electronic device may display configuration manner prompt information. The configuration manner prompt information is used to prompt the user to confirm whether to synchronize the AP configuration information of the Wi-Fi network to which the electronic device has connected. If the electronic device determines, based on a selection of the user, to synchronize the AP configuration information of the Wi-Fi network to which the electronic device has ever connected, the electronic device obtains the AP configuration information that is stored in the electronic device and that is of the connected Wi-Fi network, that is, obtains the AP configuration information of the electronic device. If the electronic device determines, based on a selection of the user, not to synchronize the AP configuration information of the Wi-Fi network to which the electronic device has ever connected, the electronic device obtains the AP configuration information of the electronic device based on the input of the user. The electronic device receives the AP configuration information input by the user, and stores the AP configuration information, that is, obtains the AP configuration information of the electronic device. The AP configuration information may include an SSID, an access password, an encryption type, and the like. The encryption type may include open, WEP, WPA2-PSK, or the like.

Figure 6:
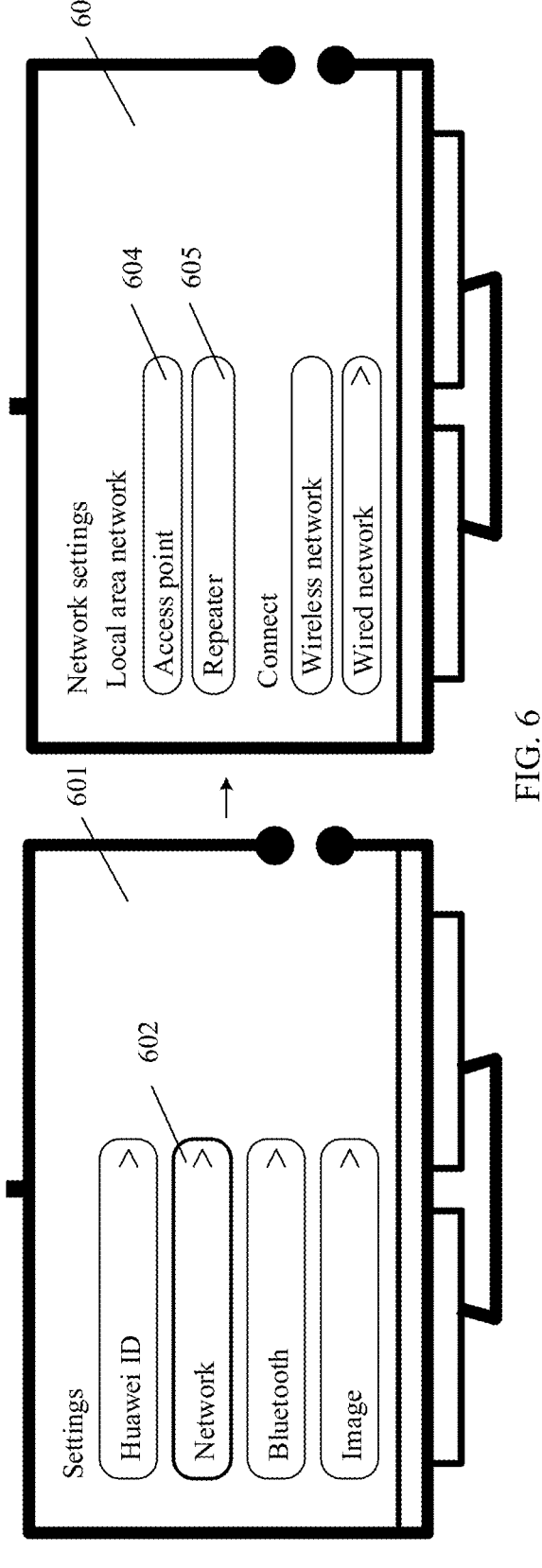
FIG. 6 is a schematic diagram 1 of an example of a display interface of an electronic device according to an embodiment of this application.

For example, as shown in FIG. 6, a user opens a setting interface of a smart screen, and the setting interface 601 includes a "Network" option 602. The "Network" option 602 is used to set network-related configurations of the smart screen. The smart screen receives a select operation performed by the user on the "Network" option 602. For example, the smart screen displays the setting interface 601.

The user may press an up button (for example, the up button 481 shown in FIG. 2B) on a remote control (for example, the remote control 480 shown in FIG. 2B) to move a focus upward, and may press a down button (for example, the down button 482 shown in FIG. 2B) on the remote control (for example, the remote control 480 shown in FIG. 2B) to move the focus to downward. When the focus falls on the "Network" option 602, the user presses an OK button (for example, the OK button 485 shown in FIG. 2B) on the remote control (for example, the remote control 480 shown in FIG. 2B). The remote control 480 sends a wireless signal corresponding to the OK button 485 to the smart screen. If the smart screen receives, by using the wireless communication module 450 (for example, IR), the signal corresponding to the OK button 485, the smart screen determines that the select operation performed by the user on the "Network" option 602 is received. In response to the received select operation performed by the user on the "Network" option 602, the smart screen displays a "Network settings" interface 603. The "Network settings" interface 603 includes an "Access point" option 604. The "Access point" option 604 is used to configure an AP function. The smart screen receives a select operation performed by the user on the "Access point" option 604. For example, when a focus falls on the "Access point" option 604, the user presses the OK button (for example, the OK button 485 shown in FIG. 2B) on the remote control (for example, the remote control 480 shown in FIG. 2B). The remote control 480 sends, to the smart screen, a wireless signal corresponding to the OK button 485. The smart screen receives, by using the wireless communication module 450 (for example, IR), the signal corresponding to the OK button 485, and determines that the select operation performed by the user on the "Access point" option 604 is received. The smart screen receives the select operation performed by the user on the "Access point" option 604, that is, receives an operation of manually configuring the electronic device to support automatic enabling of the AP function by the user. In response to the received select operation performed by the user on the "Access point" option 604, the smart screen may display a prompt box 701 for enabling an AP shown in FIG. 7.

Figure 7:
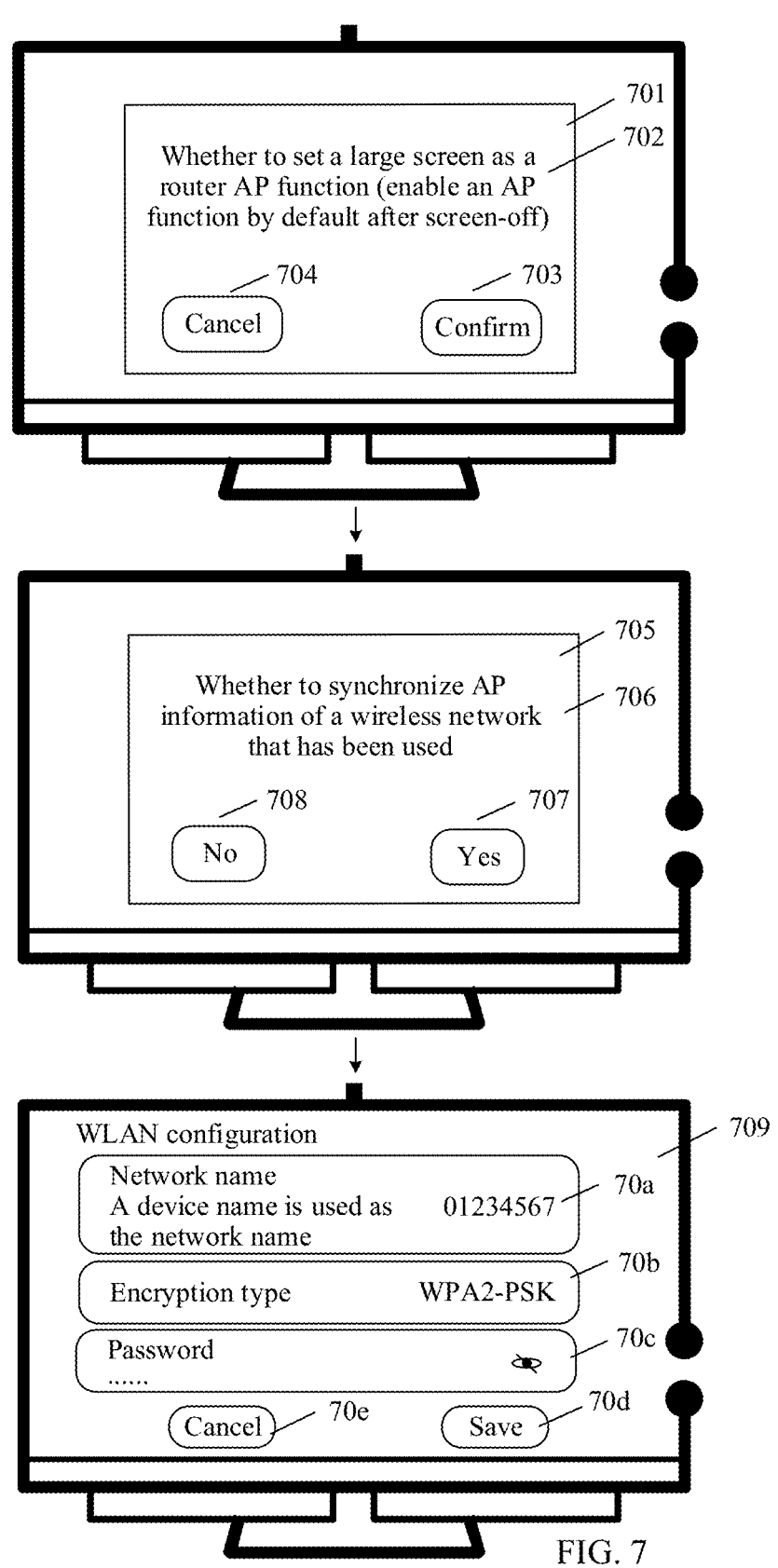
FIG. 7 is a schematic diagram 2 of an example of a display interface of an electronic device according to an embodiment of this application.

For example, as shown in FIG. 7, the prompt box 701 for enabling an AP may include prompt information 702 for enabling an AP. The prompt information 702 for enabling an AP is used to prompt the user to confirm to configure automatic enabling of the AP function for the smart screen. For example, the prompt information 702 for enabling an AP may be "Whether to set a large screen as a router AP function". In an embodiment, the prompt box 701 for enabling an AP may further include prompt information "Enable the AP function by default after screen-off". The prompt box 701 for enabling an AP may further include a "Confirm" button 703 and a "Cancel" button 704. The "Confirm" button 703 is used to trigger the smart screen to obtain AP configuration information. The "Cancel" button 704 is used to skip triggering the smart screen to obtain AP configuration information. The smart screen may receive a select operation performed by the user on the "Confirm" button 703. For example, when a focus falls on the "Confirm" button 703, the user presses the OK button (for example, the OK button 485 shown in FIG. 2B) on the remote control (for example, the remote control 480 shown in FIG. 2B) to select the "Confirm" button 703. In response to the select operation performed by the user on the "Confirm" button 703, the smart screen is triggered to obtain the AP configuration information. In an example, in response to the select operation performed by the user on the "Confirm"

button 703, the smart screen displays a prompt box 705 for configuring AP. The prompt box 705 for configuring AP may include prompt information 706 for synchronizing configuration information, used to prompt the user to confirm whether to synchronize AP configuration information of a connected Wi-Fi network. For example, the prompt information 706 for synchronizing configuration information may be "Whether to synchronize AP information of a wireless network that has been used". The prompt box 705 for configuring AP may further include a "Yes" button 707 and a "No" button 708. The "Yes" button 707 is used to trigger the smart screen to synchronize the AP configuration information that is locally stored and that is of the wireless network that has been used. The "No" button 708 is used to trigger obtaining of the AP configuration information based on an input of the user. For example, the smart screen may receive a select operation performed by the user on the "Yes" button 707. For example, when a focus falls on the "Yes" button 707, the user presses the OK button (for example, the OK button 485 shown in FIG. 2B) on the remote control (for example, the remote control 480 shown in FIG. 2B) to select the "Yes" button 707. In response to the select operation performed by the user on the "Yes" button 707, the smart screen uses, as the AP configuration information of the smart screen, the AP configuration information that is stored in the smart screen and that is of the Wi-Fi network to which the smart screen has connected. For example, the smart screen may receive a select operation performed by the user on the "No" button 708. For example, when a focus falls on the "No" button 708, the user presses the OK button (for example, the OK button 485 shown in FIG. 2B) on the remote control (for example, the remote control 480 shown in FIG. 2B) to select the "No" button 708. In response to the select operation performed by the user on the "No" button 708, a "WLAN configuration" interface 709 is displayed. The "WLAN configuration" interface 709 may include a "Network name" option 70a, an "Encryption type" option 70b, and a "Password" input box 70c. The "Network name" option 70a is used to set an SSID. The "Encryption type" option 70b is used to set an encryption type. The "Password" input box 70c is used to input an access password. The "WLAN configuration" interface 709 may further include a "Save" button 70d and a "Cancel" button 70e. The "Save" button 70d is used to trigger saving of information input by the user on the "WLAN configuration" interface 709. The "Cancel" button 70e is used to trigger skipping saving of information input by the user on the "WLAN configuration" interface 709.

In some other embodiments, after the electronic device is powered on, it is confirmed that the electronic device is connected to neither a wired network nor a wireless network. The electronic device is connected to the wired network by connecting a network cable during use. Scenario 2 in FIG. 5A and FIG. 5B: The electronic device is connected to a wired network when the electronic device is powered on and works normally.

In an embodiment, after the electronic device is powered on, it is confirmed that the electronic device is connected to neither a wired network nor a wireless network. Access to the wired network is detected. For example, in FIG. 2A, the processor 410 detects that a network cable is inserted into a network cable interface of the interface module 460, to access the wired network. In response to the access to the wired network, the electronic device obtains the AP configuration information. In an embodiment, before obtaining the AP configuration information, the electronic device may display first prompt information. The first prompt information is used to prompt the user to confirm to set the electronic device to support automatic enabling of the AP function. Further, if the electronic device determines, based on a selection of the user, to support automatic enabling of the AP function, the electronic device obtains the AP configuration information. If the electronic device determines, based on a selection of the user, not to support automatic enabling of the AP function, the electronic device exits, and does not obtain the AP configuration information. A manner in which the electronic device obtains the AP configuration information is the same as that in Scenario 1, and details are not described herein again.

For example, if the smart screen detects the access to the wired network, the smart screen displays the prompt box 701 for enabling an AP shown in FIG. 7, and obtains the AP configuration information based on the selection of the user. For a procedure, refer to FIG. 7. Details are not described herein again.

In some other embodiments, after being powered on, the electronic device determines that the electronic device is not connected to a wired network; and the electronic device accesses a Wi-Fi network. Scenario 3 in FIG. 5A and FIG. 5B: The electronic device is connected to a wireless network.

In an embodiment, after being powered on, the electronic device accesses the Wi-Fi network. The user manually configures the electronic device to support automatic enabling of the relay function. For example, the user may open a setting application on the display interface of the smart screen, and set the smart screen to support automatic enabling of the relay function. The electronic device receives an operation of manually configuring the electronic device to support automatic enabling of the relay function by the user. In response to the operation of manually configuring the electronic device to support automatic enabling of the relay function by the user, the electronic device obtains the AP configuration information of the Wi-Fi network accessed by the electronic device. In an embodiment, before obtaining the AP configuration information of the Wi-Fi network accessed by the electronic device, the electronic device may display second prompt information. The second prompt information is used to prompt the user to confirm to set the electronic device to support automatic enabling of the relay function. Further, the electronic device determines, based on a selection of the user, whether to support automatic enabling of the relay function. If the electronic device determines, based on a selection of the user, to support automatic enabling of the relay function, the electronic device obtains the AP configuration information of the Wi-Fi network accessed by the electronic device. In an embodiment, when accessing a Wi-Fi network, the electronic device obtains AP configuration information that is of the Wi-Fi network and that is input by the user, and stores the AP configuration information of the Wi-Fi network. If the electronic device determines, based on a selection of the user, to support automatic enabling of the relay function, the electronic device obtains the AP configuration information that is stored in the electronic device and that is of the Wi-Fi network accessed by the electronic device. If the electronic device determines, based on a selection of the user, not to support automatic enabling of the relay function, the electronic device exits, and does not obtain the AP configuration information of the Wi-Fi network accessed by the electronic device.

Figure 8:
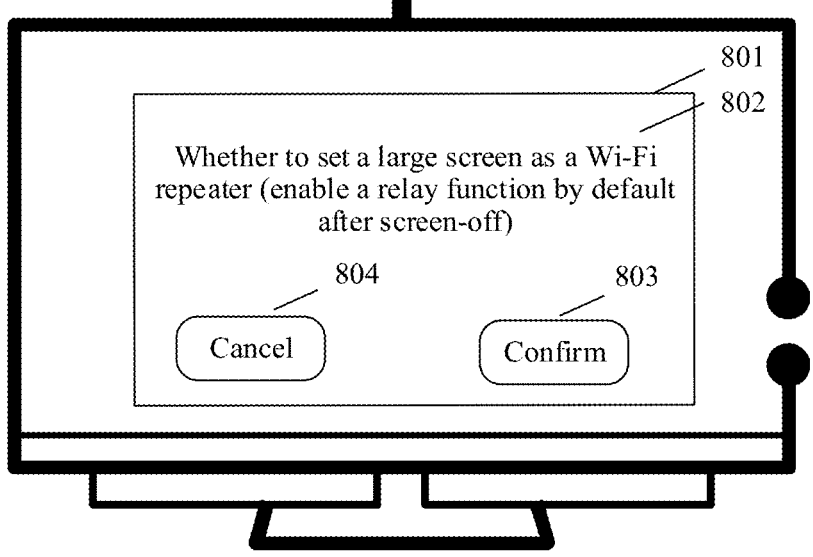
FIG. 8 is a schematic diagram 3 of an example of a display interface of an electronic device according to an embodiment of this application.

For example, as shown in FIG. 6, the user opens the setting interface of the smart screen, and the setting interface 601 includes a "Network" option 602. The "Network"

option 602 is used to set network-related configurations of the smart screen. The smart screen receives a select operation performed by the user on the "Network" option 602. In response to the received select operation performed by the user on the "Network" option 602, the smart screen displays a "Network settings" interface 603. The "Network settings" interface 603 includes a "Repeater" option 605. The "Repeater" option 605 is used to configure the relay function. The smart screen receives a select operation performed by the user on the "Repeater" option 605. For example, when a focus falls on the "Repeater" option 605, the user presses the OK button (for example, the OK button 485 shown in FIG. 2B) on the remote control (for example, the remote control 480 shown in FIG. 2B). The remote control 480 sends, to the smart screen, a wireless signal corresponding to the OK button 485. The smart screen receives, by using the wireless communication module 450 (for example, IR), the signal corresponding to the OK button 485, and determines that the select operation performed by the user on the "Repeater" option 605 is received. The smart screen receives the select operation performed by the user on the "Repeater" option 605, that is, receives an operation of manually configuring the electronic device to support automatic enabling of the relay function by the user. In response to the received select operation performed by the user on the "Repeater" option 605, the smart screen may display a prompt box 801 for enabling a relay function shown in FIG. 8. The prompt box 801 for enabling a relay function may include prompt information 802 for enabling a relay function. The prompt information 802 for enabling a relay function is used to prompt the user to confirm to configure automatic enabling of the relay function for the smart screen. For example, the prompt information 802 for enabling a relay function may be "Whether to set a large screen as a Wi-Fi repeater". In an embodiment, the prompt box 801 for enabling a relay function may further include prompt information "Enable the relay function by default after screen-off". The prompt box 801 for enabling a relay function may further include a "Confirm" button 803 and a "Cancel" button 804. The "Confirm" button 803 is used to trigger the smart screen to obtain AP configuration information of a Wi-Fi network accessed by the smart screen. The "Cancel" button 804 is configured to skip triggering the smart screen to obtain AP configuration information of a Wi-Fi network accessed by the smart screen. The smart screen may receive a select operation performed by the user on the "Confirm" button 803, and synchronize, in response to the select operation performed by the user on the "Confirm" button 803, the AP configuration information of the Wi-Fi network accessed by the smart screen.

S402: Periodically detect a status of the electronic device.

For example, the electronic device periodically detects the status of the electronic device at an interval of one hour. For example, the electronic device may detect whether the electronic device is connected to a power supply, whether the electronic device does not use a network within preset duration, and the like. For example, that the electronic device does not use the network within the preset duration may include: The electronic device is screen-off, the electronic device is in a standby state, the electronic device does not upload or download data within the preset duration, or the like.

S403: Determine that a specified condition is met, and enable a Wi-Fi function based on a network access mode of the electronic device.

If it is determined that the electronic device is connected to the power supply and does not use the network within the preset duration, and is connected to a wired network, the AP function of the electronic device is enabled (that is, the electronic device is set to an AP mode based on the obtained AP configuration information, to provide a wireless-to-wired bridging function). For example, the processor 410 in FIG. 2A determines, based on feedback of the power module 470, that the electronic device 400 is in a state of being connected to a power supply, determines, by using the network cable interface of the interface module 460, that the electronic device 400 is connected to a wired network, and detects that the display 440 is screen-off. The processor 410 determines to enable an AP function. The processor 410 notifies the wireless communication module 450 (a Wi-Fi chip) of enabling an AP mode. The Wi-Fi chip reads AP configuration information stored in the memory 420, and enables the AP mode based on the AP configuration information, to form a Wi-Fi network.

If it is determined that the electronic device is connected to the power supply and does not use the network within the preset duration, and is connected to a wireless network, the relay function of the electronic device is enabled (that is, the electronic device is set to a repeater mode based on the AP configuration information of the Wi-Fi network accessed by the electronic device, to enhance strength of a Wi-Fi signal from an AP accessed by the electronic device). For example, the processor 410 in FIG. 2A determines, based on feedback of the power module 470, that the electronic device 400 is in a state of being connected to a power supply, determines, by using the wireless communication module 450 (a Wi-Fi chip), that the electronic device 400 accesses a Wi-Fi network, and detects that the display 440 is screen-off. The processor 410 determines to enable a relay function. The processor 410 notifies the wireless communication module 450 (a Wi-Fi chip) of enabling a repeater mode. The Wi-Fi chip reads AP configuration information that is stored in the memory 420 and that is of the Wi-Fi network, and enables the repeater mode based on the AP configuration information, to enhance strength of a Wi-Fi signal from an AP accessed by the Wi-Fi chip.

According to the method for automatically enabling the access point function and the relay function provided in an embodiment of the application, when the electronic device is connected to the wired network and does not use the network, the AP function may be automatically enabled; or when the electronic device is connected to the wireless network and does not use the network, the relay function may be automatically enabled, and networking with home Wi-Fi achieves an objective of improving Wi-Fi quality. According to the method for automatically enabling the access point function and the relay function provided in an embodiment of the application, an idle electronic device can be used to expand a home network. This improves Wi-Fi use experience.

It may be understood that, to implement the foregoing functions, the electronic device includes corresponding hardware structures and/or software modules for performing the functions. It may be understood that, with reference to units and algorithm operations of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that the embodiment goes beyond the scope of embodiments of this application.

In an embodiments of the embodiment, the foregoing electronic device may be divided into function modules based on the foregoing method examples. For example, each function module may be obtained through division based on each corresponding function, or two or more functions may be integrated into one processing module. The foregoing integrated module may be implemented in a form of hardware, or may be implemented in a form of a software function module. It should be noted that, in embodiments of this application, module division is an example, and is merely a logical function division. In an embodiment, another division manner may be used.

Figure 9:
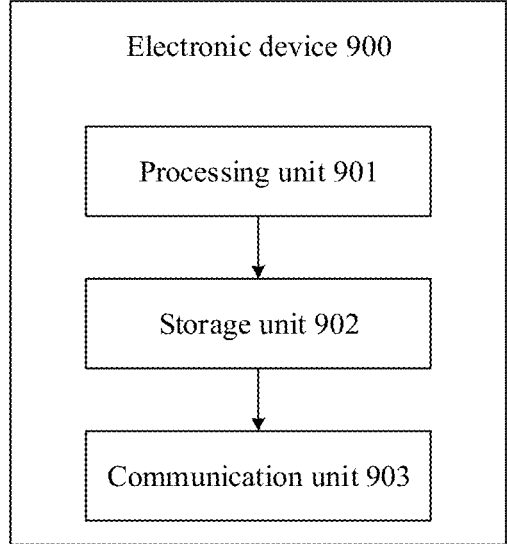
FIG. 9 is a schematic composition diagram of a structure of an electronic device according to an embodiment of this application.

When an integrated unit is used, FIG. 9 is a possible schematic diagram of a structure of the electronic device in the foregoing embodiments. The electronic device 900 includes a processing unit 901, a storage unit 902, and a communication unit 903.

The processing unit 901 is configured to control and manage an action of the electronic device 900, for example, may be configured to perform processing operations of S401, S402, and S403 in FIG. 4, and/or may be configured to perform another process of the technology described in this specification.

The storage unit 902 is configured to store program code and data of the electronic device 900, for example, may be configured to store AP configuration information.

The communication unit 903 is configured to support the electronic device 900 in communicating with another apparatus, for example, may be configured to provide an AP function or a relay function.

Certainly, the units and modules in the electronic device 900 include but are not limited to the processing unit 901, the storage unit 902, and the communication unit 903. For example, the electronic device 900 may further include a display unit and an audio unit. The display unit is configured to display a display interface of the electronic device 900. For example, the display unit may be configured to display the setting interface in FIG. 6, the prompt information and the WLAN configuration interface in FIG. 7, and the prompt information in FIG. 8. The audio unit is configured to play a sound and the like.

The processing unit 901 may be a processor or a controller, for example, may be a central processing unit (CPU), a digital signal processor (DSP), an application-specific integrated circuit (ASIC), a field programmable gate array (FPGA) or another programmable logic device, a transistor logic device, a hardware component, or any combination thereof. The processing unit 901 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 902 may be a memory. The communication unit 903 may be a transceiver, a transceiver circuit, a communication interface, or the like. The display unit may be a display. The audio unit may include a speaker, a receiver, and the like.

For example, the processing unit 901 is a processor (the processor 410 shown in FIG. 2A). The storage unit 902 may be a memory (the memory 420 shown in FIG. 2A). The communication unit 903 may be a wireless communication module (the wireless communication module 450 shown in FIG. 2A). The display unit may be a display (the display 440 shown in FIG. 2A). The audio unit may include a speaker (the speaker 430A shown in FIG. 2A) or the like. The electronic device 900 provided in an embodiment of the application may be the electronic device 400 shown in FIG. 2A. The processor, the memory, the communication module, and the like may be coupled together, for example, connected through a bus.

An embodiment of this application further provides a computer-readable storage medium. The computer-readable storage medium stores computer program code. When the processor executes the computer program code, an electronic device performs related method operations in FIG. 4, to implement the method in the foregoing embodiment.

An embodiment of this application further provides a computer program product. When the computer program product runs on a computer, the computer is enabled to perform related method operations in FIG. 4, to implement the method in the foregoing embodiment.

The electronic device 900, the computer-readable storage medium, and the computer program product provided in embodiments of this application each are configured to perform the corresponding methods provided above. Therefore, for beneficial effects that can be achieved by the electronic device 900, the computer-readable storage medium, and the computer program product, refer to the beneficial effects in the corresponding methods provided above. Details are not described herein again.

Based on the description of the foregoing implementations, it may be clearly understood by one of ordinary skilled in the art that, for ease and brevity of description, division of the foregoing function modules is merely used as an example for description. In actual application, the foregoing functions may be allocated to different function modules for implementation according to a requirement, that is, an internal structure of the apparatus is divided into different function modules, to implement all or some of the functions described above.

In the several embodiments provided in this application, it should be understood that the disclosed apparatuses and methods may be implemented in other manners. For example, the described apparatus embodiment is merely an example. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The foregoing integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium, and includes a plurality of instructions for instructing a device (which may be a single-chip microcomputer, a chip, or the like) or a processor to perform all or some of the operations of the method in embodiments of this application. The foregoing storage medium includes any medium that can store program code, such as a USB flash drive, a removable hard disk, a ROM, a RAM, a magnetic disk, or an optical disc.

The foregoing descriptions are merely implementations of the application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for automatically enabling an access point function and a relay function, comprising:
   determining that an electronic device is powered on;
   determining if the electronic device does not use a network within a preset duration;
   in response to determining that the electronic device does not use the network within the preset duration, displaying a prompt information used to prompt a user to confirm to set the electronic device as an access point (AP) or a repeater based on a network access mode; and
   setting, based on the confirmation, the electronic device as the AP or the repeater based on the network access mode.

2. The method according to claim 1, wherein the setting the electronic device as the AP or the repeater based on the network access mode comprises:
   if the electronic device is connected to a wired network, setting the electronic device as the AP.

3. The method according to claim 2, further comprising:
   obtaining AP configuration information of the electronic device; wherein
   the setting the electronic device as the AP comprises:
   setting the electronic device to an AP mode based on the AP configuration information.

4. The method according to claim 3, wherein the obtaining AP configuration information of the electronic device comprises:
   obtaining, by the electronic device, AP configuration information of a wireless fidelity Wi-Fi network to which the electronic device has connected; or
   receiving, by the electronic device, AP configuration information input by the user.

5. The method according to claim 3, wherein the obtaining AP configuration information of the electronic device comprises:
   when access to the wired network is detected, obtaining, by the electronic device, the AP configuration information.

6. The method according to claim 3, wherein the AP configuration information comprises at least one or more of:
   a service set identifier (SSID), an access password, or an encryption type.

7. The method according to claim 1, wherein the setting the electronic device as the AP or the repeater based on the network access mode comprises:
   if the electronic device is connected to a wireless network, setting the electronic device as the repeater.

8. The method according to claim 7, further comprising:

obtaining AP configuration information of a wireless fidelity (Wi-Fi) network accessed by the electronic device; wherein the setting the electronic device as the repeater comprises:

setting the electronic device to a repeater mode based on the AP configuration information of the Wi-Fi network.

9. The method according to claim 1, wherein that the electronic device does not use the network within the preset duration includes:

the electronic device is in a standby mode, or the electronic device does not upload or download data within the preset duration.

10. An electronic device, comprising:

a processor, and a memory coupled to the processor to store instructions, which when executed by the processor, cause the electronic device to:

determine that the electronic device is powered on; and determine if the processor does not communicate with a network within a preset duration;

in response to determining that the electronic device does not communicate with the network within the preset duration, display a prompt information used to prompt a user to confirm to set the electronic device as an access point (AP) or a repeater based on a network access mode; and set, based on the confirmation, the electronic device as the AP or the repeater based on the network access mode.

11. The electronic device according to claim 10, wherein if the electronic device is connected to a wired network, the processor sets the electronic device as the AP.

12. The electronic device according to claim 11, wherein the processor is further configured to:

obtain AP configuration information of the electronic device; and set the electronic device to an AP mode based on the AP configuration information.

13. The electronic device according to claim 12, wherein the processor obtains the AP configuration information of a wireless fidelity (Wi-Fi) network to which the electronic device has connected; or the processor receives AP configuration information input by the user.

14. The electronic device according to claim 12, wherein the instructions further cause the electronic device to:

detect whether the electronic device accesses the wired network; and the processor is configured to:

obtain the AP configuration information if the electronic device detects that the electronic device accesses the wired network.

15. The electronic device according to claim 12, wherein the AP configuration information comprises at least one of:

a service set identifier SSID, an access password, or an encryption type.

16. The electronic device according to claim 10, wherein if the electronic device is connected to a wireless network, the processor sets the electronic device as the repeater.

17. The electronic device according to claim 16, wherein the processor is further configured to:

obtain AP configuration information of a wireless fidelity (Wi-Fi) network accessed by the electronic device; and set the electronic device to a repeater mode based on the AP configuration information of the Wi-Fi network.

18. The electronic device according to claim 10, wherein when the processor does not use the network within the preset duration, the electronic device is in a standby mode, or the electronic device does not upload or download data within the preset duration.

* * * * *